July 3, 1945.  F. A. KANE, JR  2,379,719
VACUUM BOOSTER FOR WINDSHIELD WIPERS
Filed Sept. 2, 1942
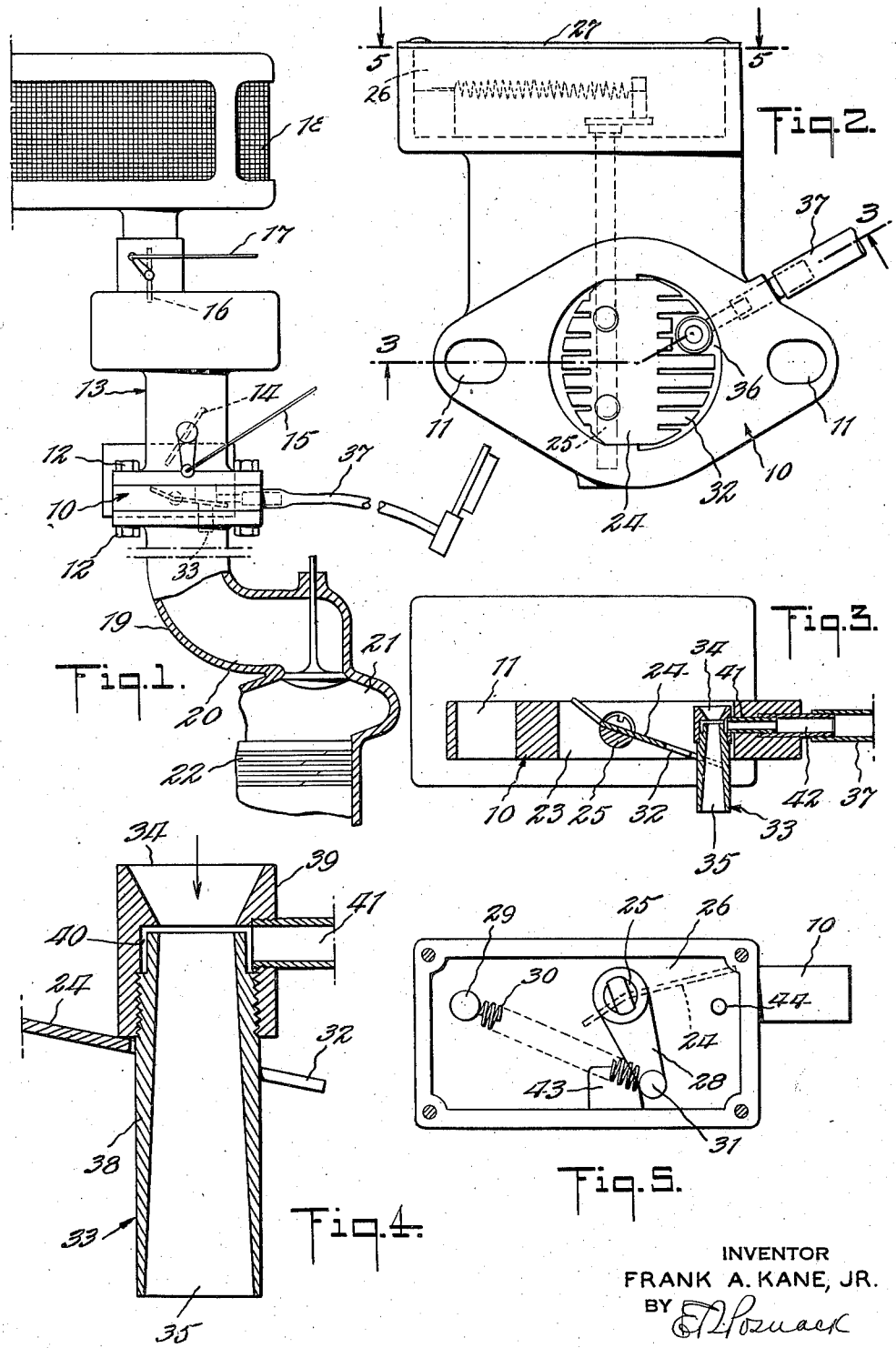
INVENTOR
FRANK A. KANE, JR.
BY
ATTORNEY Patented July 3, 1945

2,379,719

UNITED STATES PATENT OFFICE 2,379,719

VACUUM BOOSTER FOR WINDSHIELD WIPERS

Frank A. Kane, Jr., Derby, Conn., assignor to Kane Carburetor Corporation of Delaware, Wilmington, Del.

Application September 2, 1942, Serial No. 457,107

8 Claims. (Cl. 230—111)

This invention relates to vacuum boosters for internal combustion engines, and particularly to devices of this class adapted for operative use with windshield wipers connected to the induction systems of such engines.

It is known that intake manifold depressions vary considerably during the operation of an internal combustion engine, the depressions at times being below the minimum required for operating the windshield wiper connected to the manifold. During idling conditions the vacuum is obviously highest, causing the wiper to operate most efficiently; and as the throttle is opened, the vacuum diminishes considerably, the average range being from 19 inches Hg to about 4 inches Hg. Inasmuch as most windshield wipers can operate with vacuums as low as 3 inches Hg, this decrease in depression may not entirely cause a stopping of the windshield wiper, although it may affect its operative efficacy. However, when the throttle is suddenly opened, particularly at low speeds, the vacuum in the intake manifold will become exceedingly low, often reaching a value as little as ½ inch H2O, the vacuum increasing only very gradually thereafter as the car speeds up under full throttle. It is because of this sudden drop in the vacuum, particularly when the car is being accelerated, that windshield wipers stop, making it dangerous to drive during rainy weather, and particularly hazardous to attempt to pass another car in a heavy rain. To obviate this disadvantage inherent in windshield wipers operated by induction systems, various devices have been resorted to, such as separate pump or electrical apparatus, these being not only relatively expensive, but also subject to wear and continuing maintenance costs.

It is primarily within the contemplation of my invention to overcome the aforesaid shortcomings by employing a simple vacuum boosting device with a minimum of mechanical parts whereby a relatively high vacuum will be maintained under all driving conditions, thereby enabling a windshield wiper to be economically and steadily operated by the induction system of the engine.

Other objects, features and advantages will appear from the drawing and description hereinafter given.

Referring to the drawing,

Figure 1 is an elevation partly in section of a portion of an internal combustion engine showing the relative position of my invention with respect to other conventional parts of the structure including a windshield wiper.

Figure 2 is a plan view of the vacuum boosting device constituting my invention.

Figure 3 is a section of Figure 2 taken substantially along line 3—3.

Figure 4 is an enlarged section of the Venturi tube employed in my invention, showing its relation to the valve forming part thereof, and Figure 5 is an end view of Figure 2, taken substantially along line 5—5 thereof, the cover plate being removed.

In the drawing, and particularly in Figure 1 thereof, the structure of my invention is illustrated as including the casing 10, preferably of flat proportions, and containing bolt holes 11 for attaching the casing, by suitable bolts and nuts 12, to the engine structure. The intake portion of the device communicates with or is secured to the carburetor structure 13 which contains the throttle valve 14 manually or otherwise controlled by the link 15. The carburetor is also provided with the choke valve 16 suitably actuated by link 17, the air for the fuel entering through the air strainer 18. The atomization and mixing details of the carburetor are not shown in the drawing inasmuch as they may be of any conventional construction for the purposes of this invention. The outlet portion of the device is connected in the form illustrated to the intake manifold trunk 19 which is suitably connected through the manifold branch 20 to the combustion chamber 21 of the cylinder 22.

The casing 10 of my invention contains therein a conduit 23 which connects between the said throttle valve of the carburetor and the intake manifold. Rotatably mounted within said conduit is the unbalanced valve 24, this, in the preferred form of my invention, comprising a flat disc pivotally mounted off-center on shaft 25. The casing contains exteriorly disposed with respect to the conduit a chamber 26 normally kept closed under operating conditions by the cover plate 27. Extending into said chamber is one terminal of the said shaft 25, the said terminal having rigidly affixed thereto the lever 28. Anchored at lug 29 of the casing is the spring 30 which is suitably attached to said lever 28 at the extremity 31 thereof.

The arrangement is such that under normal inoperative conditions the valve 24 will be yieldably urged into its closed position by the said spring 30. The valve will obviously be opened as the result of a pressure differential on opposite sides thereof produced by engine operation, the long portion 32 of the valve being caused to move towards the intake portion of the engine. It is thus apparent that even when the throttle 14 is suddenly opened, the yieldable action of spring 30 will cause the valve 24 to open gradually, thereby preventing a sudden decrease in intake vacuum. By suitably adjusting the tension in spring 30, a vacuum of predetermined value, within certain limits, can be obtained. It has been found, for example, that when the intake manifold depression would normally be one-half inch H₂O in a conventional system the vacuum could be raised to about 1 inch Hg, with a proper setting of the valve.

The use of valve 24 constitutes one stage in the process of boosting the vacuum, with my invention, to a value sufficiently high to operate a windshield wiper under normally difficult conditions. The next step effectuated by my invention is the boosting of the vacuum obtained by valve 24 to a much higher value, which I accomplish by means of a Venturi arrangement to be now described.

In my preferred arrangement, a Venturi tube 33 is employed, this being disposed longitudinally of conduit 23 and in fixed relation thereto. In the structure illustrated, the Venturi tube is adjacent the wall of the conduit at the long portion 32 of valve 24, the inlet or approach end 34 of the venturi being on the carburetor side of the valve, and the outlet end 35 preferably extending beyond the casing 10 and being disposed on the intake manifold side of the valve. The said long portion 32 of valve 24 contains an aperture 36 at the peripheral portion thereof, proportioned to accommodate the venturi 33.

It will be observed that the throat or restricted region of the venturi is positioned within the said conduit 23; and communicating with said throat is the rubber hose 37 adapted for attachment to a windshield wiper in conventional manner. The details of the windshield wiper are not shown in the drawing inasmuch as it is not a part of this invention and may, for the purposes of this application, be of any conventional construction adapted for attachment to the intake manifold of an engine. In the specific structure illustrated, the venturi is shown to consist of a relatively elongated outlet portion 38 (see Figure 4), and an inlet portion 39 suitably secured to the outlet portion 38 in such manner as to leave an annular space or chamber 40 therebetween. Extending through the conduit body or casing 10 is the tubular member 41 communicating between said chamber 40 and the pipe 42 connected to said hose 37. It is of course understood that other conduit means may be employed between the throat of the venturi and the outside of the casing, within the scope of this invention, the preferred arrangement being to have the windshield wiper tube connect with the Venturi throat through a passageway terminating outside of the conduit.

In the operation of this device, the valve member 24 is normally urged, as aforesaid, into its closed position, the lever 28 being disposed against stop 43; and the valve is opened in response to a pressure differential on opposite sides thereof to a limiting position controlled by stop 44 with which said lever is abuttable. Due to the high velocity of the mixture flowing through the throat of the venturi 33, a considerably higher suction is obtained in hose 37 connected to the windshield wiper than either in conduit 23 outside of the venturi, or in the intake manifold. It has been found that when the valve 24 is set to produce 1 inch Hg, a suction of about 6 inches Hg is obtained in hose 37, which is more than sufficient to operate a windshield wiper. It is thus apparent that the combination of valve 24 and venturi 33, as hereinabove described, is adapted to produce sufficiently high depressions to operate a windshield wiper even under such unfavorable conditions as exist upon the sudden opening of the throttle at low speeds, or when the engine is being accelerated.

It will be noted that the valve 24 is shown to contain slots therein and has a portion thereof bent towards the carburetor, this being in accordance with the structure shown in Patent No. 2,220,723. It is, nevertheless, to be understood that this invention is not limited to this particular type of valve construction nor to the precise position, and that the embodiment described and shown in the drawing is merely illustrative of this invention and not employed by way of limitation, inasmuch as numerous changes and modifications may be made within the scope of the appended claims without departing from the spirit of this invention.

What I claim is:

1. In a vacuum booster of the class described, a conduit, an unbalanced valve within said conduit, yieldable means urging said valve towards its closed position, said valve having an apertured portion therein, a Venturi tube extending through said apertured portion and communicating with opposite sides of the valve, the Venturi tube being in fixed relation to the conduit, and a passageway extending from the region of the throat of the venturi to the outside of the conduit.

2. In a vacuum booster of the class described, a conduit, an unbalanced valve within said conduit, yieldable means urging said valve towards its closed position, said valve having an apertured portion therein, a Venturi tube extending through said apertured portion substantially longitudinally of the conduit and communicating with opposite sides of the valve, the throat of the venturi being disposed within the conduit and at least one terminal portion extending outside of the conduit, and a passageway extending from the region of the throat of the venturi through the body of the conduit.

3. In a vacuum booster of the class described, a conduit, an unbalanced valve within said conduit, yieldable means urging said valve towards its closed position, a Venturi tube within said conduit and extending substantially longitudinally thereof, the opposite ends of said venturi being at opposite sides of the valve, the wall of the venturi in the region of the throat thereof having an annular chamber, and a passageway extending from said chamber to the outside of the conduit.

4. In a windshield wiping apparatus, a vacuum booster comprising a conduit, an unbalanced valve within said conduit, a yieldable means urging said valve towards its closed position, the valve being operatively responsive to a pressure differential on opposite sides thereof, a Venturi tube communicating with opposite sides of said valve, a pipe for connection to the point of use, and tubular means communicating between the throat of the Venturi tube and said pipe.

5. In combination with the intake manifold of an internal combustion engine, a vacuum booster for a windshield wiper comprising a conduit communicating with the intake manifold, a disc valve pivotally mounted off-center within the conduit, yieldable means outside of said conduit urging said valve towards its closed position, the valve being operatively responsive to a pressure differential on opposite sides thereof, the long portion of the valve being operatively movable towards the intake manifold when an opening effort is exerted on the valve, a Venturi tube within the conduit and having the opposite ends thereof at opposite sides of the long portion of the valve, a pipe for connection with a point of use, and tubular means communicating between the throat of the Venturi tube and said pipe.

6. In combination with the intake manifold of an internal combustion engine, a vacuum booster according to claim 5, the inlet end of the Venturi tube being disposed on the high pressure side of the valve, and the outlet end on the low pressure side of the valve, the Venturi tube extending substantially longitudinally of the conduit.

7. In combination with the intake manifold of an internal combustion engine, a vacuum booster for a windshield wiper comprising a conduit communicating with the intake manifold, a disc valve pivotally mounted off-center within the conduit, yieldable means outside of said conduit urging said valve towards its closed position, the valve being operatively responsive to a pressure differential on opposite sides thereof, the long portion of the valve being operatively movable towards the intake manifold when an opening effort is exerted on the valve, the long portion of the valve being recessed at a peripheral portion thereof, a Venturi tube in fixed relation to the conduit and disposed within said recessed portion, said venturi communicating with opposite sides of the valve, a pipe for connection with the point of use, and tubular means communicating between the throat of the Venturi tube and said pipe.

8. In combination with the intake manifold of an internal combustion engine, a vacuum booster for a windshield wiper comprising a substantially flat casing, a conduit extending therethrough, an unbalanced valve within said conduit, yieldable means urging said valve towards its closed position, the valve being operatively responsive to a pressure differential on opposite sides thereof, an apertured portion in said valve, a Venturi tube extending longitudinally of the conduit and disposed within said apertured portion of the valve, said Venturi tube being in fixed relation to the casing and adjacent the wall of the conduit, said Venturi tube communicating with opposite sides of said valve, and channel means extending from the throat of said venturi through the body of said casing for connection with the point of use.

FRANK A. KANE, Jr.